US010943203B2

United States Patent
Oshry et al.

(10) Patent No.: US 10,943,203 B2
(45) Date of Patent: Mar. 9, 2021

(54) GEOGRAPHIC REGION MODIFICATION TOOL FOR DATABASE QUERY ENHANCEMENT

(71) Applicant: MASTERCARD INTERNATIONAL INCORPORATED, Purchase, NY (US)

(72) Inventors: Steven Bruce Oshry, Tarrytown, NY (US); Luckner Polycarpe, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 317 days.

(21) Appl. No.: 15/859,959

(22) Filed: Jan. 2, 2018

(65) Prior Publication Data

US 2019/0205807 A1 Jul. 4, 2019

(51) Int. Cl.

| | |
|---|---|
| ***G06Q 10/06*** | (2012.01) |
| ***G06Q 20/34*** | (2012.01) |
| ***G06F 16/29*** | (2019.01) |
| ***G06F 16/9537*** | (2019.01) |

(52) U.S. Cl.

CPC ....... *G06Q 10/06393* (2013.01); *G06F 16/29* (2019.01); *G06F 16/9537* (2019.01); *G06Q 20/34* (2013.01)

(58) Field of Classification Search

CPC .............. G06Q 10/06393; G06Q 20/34; G06F 16/9537; G06F 16/29

See application file for complete search history.

(56) References Cited

U.S. PATENT DOCUMENTS

| | | | | |
|---|---|---|---|---|
| 2014/0236678 | A1* | 8/2014 | Akerman | G06F 16/9537 705/7.34 |
| 2018/0349922 | A1* | 12/2018 | Carlson | G06Q 30/0254 |
| 2019/0095939 | A1* | 3/2019 | Hickman | G06Q 30/0205 |

* cited by examiner

*Primary Examiner* — Sujay Koneru
*Assistant Examiner* — Mohamed N El-Bathy
(74) *Attorney, Agent, or Firm* — Howard IP Law Group, PC

(57) ABSTRACT

A computer-implemented system is configured to, responsive to failure of anonymity threshold criteria of a payment card transaction based dataset including a geographical region definition including solely a first geographical region, query a geographical information service for data indicative of geographical regions neighboring a first geographical region; iteratively query the payment card transaction based dataset using queries modifying the geographical region definition to include the first geographical region and one or more neighboring geographical regions; test returned results against the anonymity threshold criteria; and responsive to a positive test result, generating an approval indication for a data set.

17 Claims, 10 Drawing Sheets

GEOGRAPHIC REGION MODIFICATION TOOL FOR DATABASE QUERY ENHANCEMENT

CROSS-REFERENCE TO RELATED APPLICATIONS

None.

FIELD OF INVENTION

Embodiments relate to computerized systems that address technological problems in querying computer databases and record keeping.

BACKGROUND

Technological developments in the field of payment card networks have made available data warehouses incorporating payment card transaction data collected from payment card networks.

A technique that has been developed in connection with leveraging data warehouses containing data including records of payment card transaction data is the preparation of targeted data incorporating a business, such as a merchant accepting payment card payments, and other similar businesses. The definition of other similar businesses may be referred to as a competitive set. Among criteria employed in a competitive set is geographic proximity to a merchant requesting the targeted data.

In the payment card transaction data field, a business challenge has arisen as a result of the intersection of business needs and new technological developments. Collected payment card transaction data provides a substantial resource for analysis of business trends, and can be highly targeted. However, merchant participants in payment card networks do not permit their payment card transaction data to be disclosed in identifiable form to other businesses, as a condition of permitting use of their data. In order to protect merchant payment card transaction data from being individually identifiable, criteria have been developed for minimum quantities of payment card transaction data that may be disclosed in a competitive set. Such minimum data quantities may include a variety of factors, such as a threshold minimum number of merchants, a threshold maximum share of sales by any one merchant, and other criteria.

A challenge generated by requests for targeted geographic data and thresholds of minimum data quantities is that geographic regions may not contain sufficient numbers of merchants to provide responsive data. Efficient approaches are desired to address this challenge.

SUMMARY

In some embodiments, a computer system includes one or more computer processors; an input/output device coupled to the one or more computer processors and to a network; a data storage device; and a memory unit storing computer-executable instructions. The instructions, when executed by the one or more computer processors, cause the one or more computer processors to: receive data indicative of a first geographical area defined by a boundary; generate a query for submission to a geographical information service interface; furnish the query, via the input/output device, to the geographical information service interface; receive, via the input/output device, from the geographical information service interface, data responsive to the query, the data responsive to the query including data identifying a plurality of second geographical areas neighboring the first geographical area; generate a query for submission to a data warehouse containing data indicative of payment card transactions, the payment card transaction data including at least merchant location data indicative of geographical area associated with a merchant and at least one other merchant attribute, the query including a request for data responsive to merchants associated with the first geographical area and at least one of the second geographical areas and a competitive data set; transmit the generated query to the data warehouse; receive a response to the generated query from the data warehouse; determine, based on anonymity criteria, whether the received response qualifies for transmission to a third party; and responsive to determining that the received response qualifies for transmission to a third party, based on the anonymity criteria, flag the response for transmission to the third party.

In some embodiments, a computerized method for interfacing with a geographical information service interface to enhance data queries includes receiving, by a network server, data indicative of a failure of a query to a merchant information database as a result of a failure of data indicative of a response to the query to pass a benchmarking test; receiving, by the network server, data indicative of a first postal code associated with the query; generating, by the network server, a query for submission to a geographical information service interface seeking data indicative of second postal codes sharing a boundary with the first postal code, and transmit the generated query; receiving, by the network server, responsive to the query, data indicative of a plurality of second postal codes sharing a boundary with the first postal code; generating, by the network server, a plurality of queries for transmission to the merchant information database, each query including a geographic parameter including a pair of the first postal code and one of the second postal codes, and transmit the plurality of queries to the merchant information database; receiving, by the network server, responsive to the queries to the merchant information database, a plurality of data sets indicative of responses; applying, by the network server, the benchmarking test to the plurality of responses, to determine a data set for reporting.

In some embodiments, a non-transitory computer-readable medium stores computer-readable instructions defining a tool for interfacing with a geographical information service interface to enhance data queries, which instructions, when executed by one or more computer processors, cause the one or more computer processors to: receive data indicative of a first geographical area defined by a boundary; generate a query for submission to a geographical information service interface; furnish the query to the geographical information service interface; receive from the geographical information service interface, data responsive to the query, the data responsive to the query including data identifying a plurality of second geographical areas neighboring the first geographical area; generate a query for submission to a data warehouse containing data indicative of payment card transactions, the payment card transaction data including at least merchant location data indicative of geographical area associated with a merchant and at least one other merchant attribute, the query including a request for data responsive to merchants associated with the first geographical area and at least one of the second geographical areas and a competitive data set; transmit the generated query to the data warehouse; receive a response to the generated query from the data warehouse; determine, based on anonymity criteria, whether the received response qualifies for transmission to a third party; and responsive to determining that the received response qualifies for transmission to a third party, based on the anonymity criteria, flag the response for transmission to the third party.

DETAILED DESCRIPTION

Figure 1:
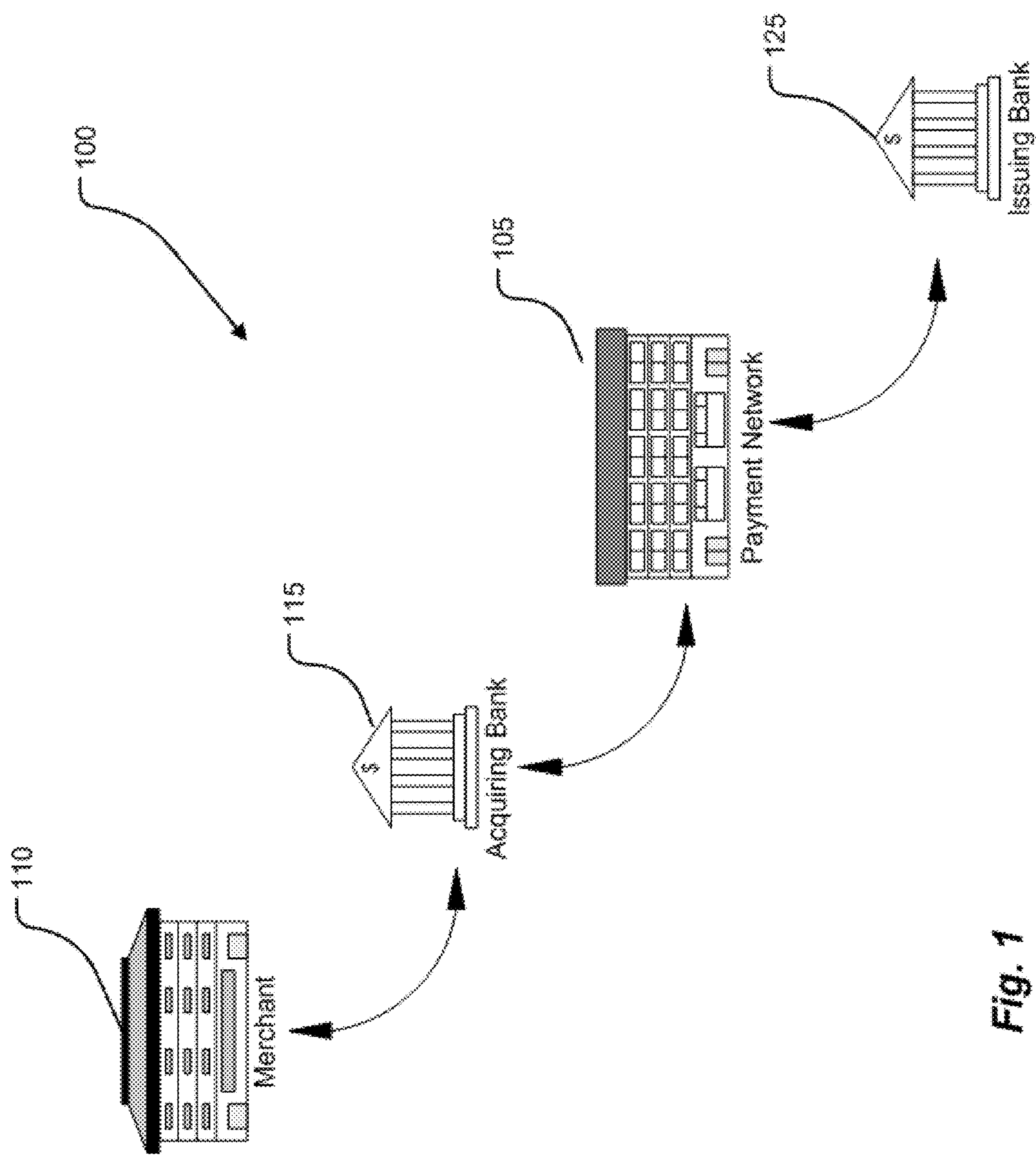
FIG. 1 is a schematic diagram illustrating an exemplary multi-party payment card system in which some embodiments may be implemented.

Disclosed herein are processor-executable methods, computing systems, and related processing directed to technological improvements for enhancing database benchmarking, including a tool for querying of records relating to payment card networks and payment card messages transmitted via payment card networks. Technological developments in the field of payment card networks and data security have made available secure data depositories of payment card transaction data accessible for analysis. Such data depositories may be suitably organized to permit searching via application of queries.

In connection with providing data indicative of trends of other merchants having identical or similar characteristics in one or more categories, a technical challenge arises when a query to a merchant information database returns data that fails benchmarking. In this context, the term benchmarking refers to a minimum set of values to provide for anonymization of aggregated merchant data. A technical problem arises in efficiently providing for a modification to a query that can efficiently interface with geographical data sources.

In embodiments, a technical problem is addressed with a technical solution in the form of a specialized tool to interface with a geographical data source and identify an expanded geographical region to employ in an enhanced query to a merchant database. In embodiments, the tool may be implemented in a software solution configured to obtain, from a geographical data source, data indicative of at least one neighboring geographic area, generate an updated query to obtain data relating to a first geographic area and a neighboring geographic area to a merchant database, receive data responsive to the updated query, compare the received data to anonymity criteria, and either designate the data as approved for reporting, or proceed to generate a further geographical region. Depending on desired processing loads to be applied to a data warehouse or depository, and local data storage desired, geographic regions may be generated and tested on a serial basis, to reduce the number of queries to be processed at the data depository, and reduce the amount of local storage of processing results, or multiple queries, such as for pairs of geographic regions, may be transmitted at the same time, and then assessed as a group.

A geographic information service server may be accessed, using a specialized tool. In embodiments, each postal code or geographic region may be considered a polygon, and a polygon neighbor file may be generated. In the polygon neighbor file, each region or postal code is associated with a list of regions or postal codes that share a boundary. Each postal code or geographic region may be interpreted, in accordance with graph theory, as a node, and the edge of each node may be the postal codes that share a boundary. Thus, the polygon neighbor file may include, for each node, a listing of each edge.

It is to be understood that a payment card is a card that can be presented by the cardholder (i.e., customer) to make a payment. By way of example, and without limiting the generality of the foregoing, a payment card can be a credit card, debit card, charge card, stored-value card, or prepaid card or nearly any other type of financial transaction card. It is noted that as used herein, the term "customer", "cardholder," "card user," and/or "card recipient" can be used interchangeably and can include any user who holds a payment card for making purchases of goods and/or services. Further, as used herein in, the term "issuer" or "attribute provider" can include, for example, a financial institution (i.e., bank) issuing a card, a merchant issuing a merchant specific card, a stand-in processor configured to act on-behalf of the card-issuer, or any other suitable institution configured to issue a payment card. As used herein, the term "transaction acquirer" can include, for example, a merchant, a merchant terminal, an automated teller machine (ATM), or any other suitable institution or device configured to initiate a financial transaction per the request of the customer or cardholder.

A "payment card processing system" or "credit card processing network", such as the MasterCard network exists, allowing consumers to use payment cards issued by a variety of issuers to shop at a variety of merchants. With this type of payment card, a card issuer or attribute provider, such as a bank, extends credit to a customer to purchase products or services. When a customer makes a purchase from an approved merchant, the card number and amount of the purchase, along with other relevant information, are transmitted via the processing network to a processing center, which verifies that the card has not been reported lost or stolen and that the card's credit limit has not been exceeded. In some cases, the customer's signature is also verified, a personal identification number is required or other user authentication mechanisms are imposed. The customer is required to repay the bank for the purchases, generally on a monthly basis. Typically, the customer incurs a finance charge for instance, if the bank is not fully repaid by the due date. The card issuer or attribute provider may also charge an annual fee.

A "business classification" is a group of merchants and/or businesses, classified by the type of goods and/or service the merchant and/or business provides. For example, the group of merchants and/or businesses can include merchants and/or businesses which provide similar goods and/or services.

In addition, the merchants and/or businesses can be classified based on geographical location, sales, and any other type of classification, which can be used to define a merchant and/or business with similar goods, services, locations, economic and/or business sector, industry and/or industry group.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Referring now to FIG. 1, there is shown a schematic diagram illustrating an exemplary multi-party payment card system 100 in which some embodiments may be implemented. Payment card system 100 may be a credit card payment system using the MasterCard® payment card system payment network 105. Such payment networks are also referred to as interchanges and interchange networks. Such payment networks provide for transmission of messages compliant with an applicable interchange message specification, such as ISO 8583. Such messages may be of variable length, and may include a Message Type Indicator field, which may specify a version of the applicable standard, a message class, a message function and message origin, and may be a 4 digit numeric field. The following field may be a bitmap that indicates which other data elements or data element subfields will be present. Data fields may include primary account number, transaction amount, transmission date and time, time, date, expiration date, merchant type, acquiring institution identification code, forwarding institution identification code, card acceptor terminal identification, card acceptor identification code, and card acceptor name/location. MasterCard® payment card system payment network is a proprietary communications standard promulgated by MasterCard International Incorporated for the exchange of financial transaction data between financial institutions that are members of MasterCard International Incorporated® (MasterCard is a registered trademark of MasterCard International Incorporated located in Purchase, N.Y.).

In payment card system 100, a financial institution 125, termed an issuer or issuing bank, has issued a payment account card, such as a credit card account or a debit card account, to a cardholder. Merchants have established accounts with financial institutions that are termed acquirer or acquiring bank in the transaction system. A transaction commences when a cardholder tenders a card to merchant 110 for payment. Card information is captured by merchant devices, such as a point of sale dedicated device via swiping of a card or chip technology, via a secure Internet connection, or via another technique. The merchant system transmits a payment card transaction message via a secure communications channel to credit card processing computer systems of acquiring bank 115. The credit card processing computer systems of acquiring bank 115 then transmit a message requesting transaction approval to a payment card processing system authorization network 105. The payment card processing system authorization network in turn determines the issuing bank and transmits a message requesting transaction approval to the credit card processing computer system of the issuer bank 125. The issuer bank payment card processing computer systems determine whether to approve the transaction, by determining whether the credit limit is sufficient, and whether any of the data included in the message requesting approval is indicative of fraud, and then provides a return message to the payment card processing system authorization network. The return message may indicate approval of the transaction, declining of the transaction, and optionally other messages with declining of the transaction, such as an instruction to hold the card. The payment card processing system authorization network then transmits the message to the acquirer computer system. The payment card processing system also stores data indicative of the approved transaction message in a database of approved payment card transactions. A message including approval is then transmitted from the acquiring bank system to the merchant point of sale device or other merchant systems.

The request from the merchant 110 to the acquiring bank 115 may be performed over a wired or wireless communication channel such as a telephone, as an alternative to the use of a dedicated point-of-sale or point-of-interaction terminal, which reads the cardholder's account information from the magnetic stripe on the payment account card or EMV chip and communicates electronically with the transaction processing computers of acquirer 115. Alternatively, acquirer 115 may authorize a third party to perform transaction processing on its behalf. In this case, the point-of-interaction terminal will be configured to communicate with the third party. Such a third party is usually called a "merchant processor" or an "acquiring processor." In some cases, as for cardholder authorized recurring payments, a merchant stores payment card information associated with a cardholder and generates a message requesting authorization from acquirer 115 using the stored payment card information, on a recurring basis. Such transactions are referred to as card-on-file (COF) transactions.

When a request for authorization is accepted, the issuer bank systems engage in certain steps. At an appropriate time, the available credit line or available balance of the cardholder's account is decreased. In certain situations, a charge is not posted immediately to a cardholder's account because bankcard associations, such as MasterCard International Incorporated, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account is decreased. Normally, a charge is posted immediately to cardholder's account. The bankcard association then transmits the approval to the acquiring processor for distribution of goods/services, or information or cash in the case of an ATM.

After a transaction is captured, the transaction is cleared and settled between merchant 110, acquirer 115, and issuer 125. Clearing refers to the communication of financial data for reconciliation purposes between the parties. Settlement refers to the transfer of funds between the merchant's account, acquirer, and issuer related to the transaction.

Figure 2:
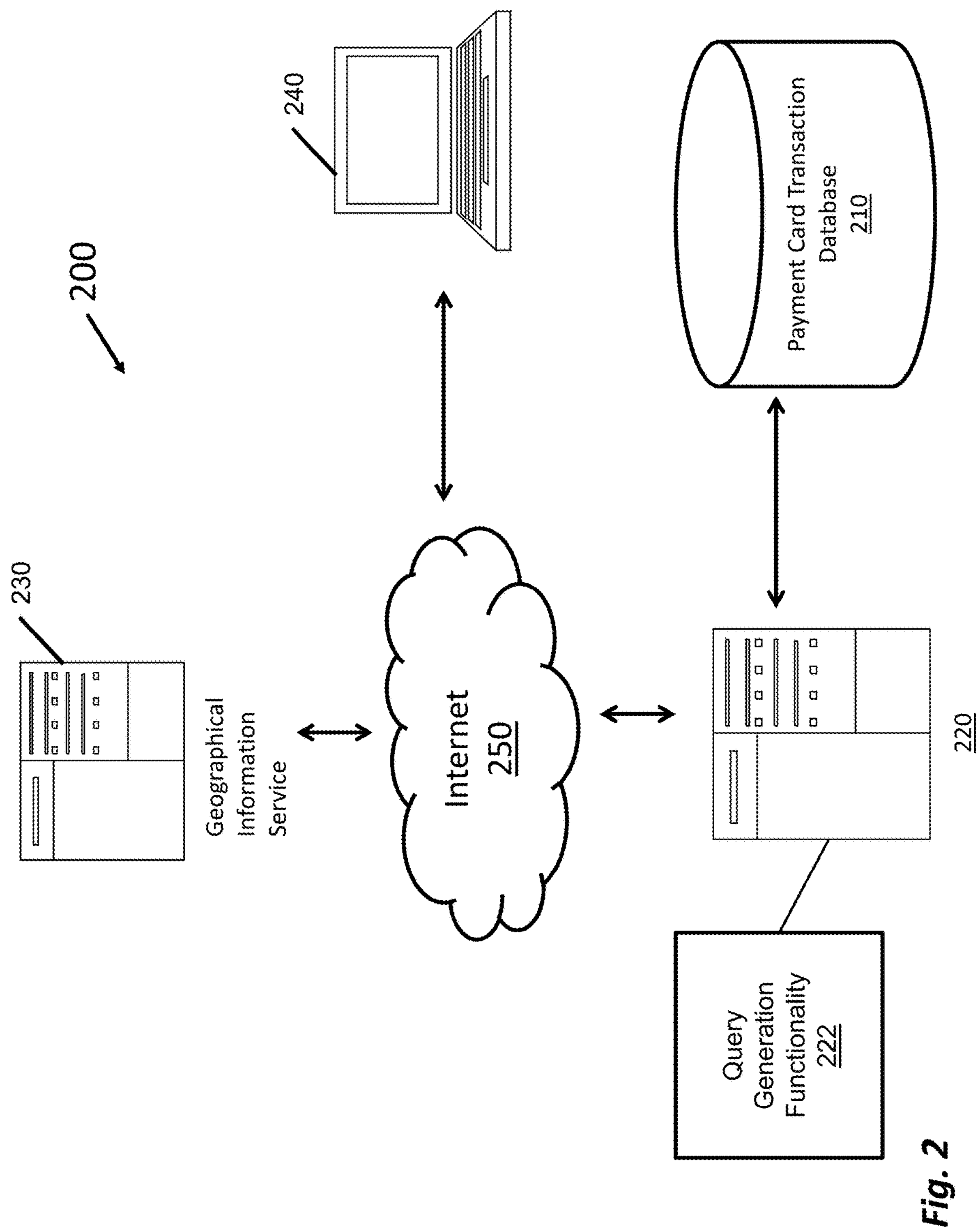
FIG. 2 is a functional block diagram of a data processing system for a payment card service provider in accordance with an exemplary embodiment.

Referring now to FIG. 2, there is shown a functional block diagram of a network including devices operative to perform data processing system for a payment card service provider in accordance with an exemplary embodiment. Payment card approved transaction database 210 is shown. Database 210 includes one or more logical databases, stored on a plurality of data storage devices at one or more physical locations. Payment card transaction database 210 may include tens of millions of records of approved payment card transactions.

Analytics server 220 includes functionality 222 for generation of queries to the payment card transaction database. Functionality 222 includes a modified functionality for modification of geographic restrictions on queries. Functionality 222 may be implemented in software computer logic or firmware, for example. By way of example, functionality 222 may generate queries including limitations as to business type, such as SIC code, date limits, dollar value limits, time of day limits, day of week limits, and one or more geographic parameters. The one or more geographic parameters may include one or more postal codes, governmental units, or other types of distinct geographic areas.

Analytics server 220 is in communication via one or more networks, such as Internet 250, with geographical information service server 230, and user-accessible device 240. Geographical information service server 230 may be accessible to analytics server 220, which may provide queries to geographical information service server 230 via one or more application program interfaces (API).

Figure 3:
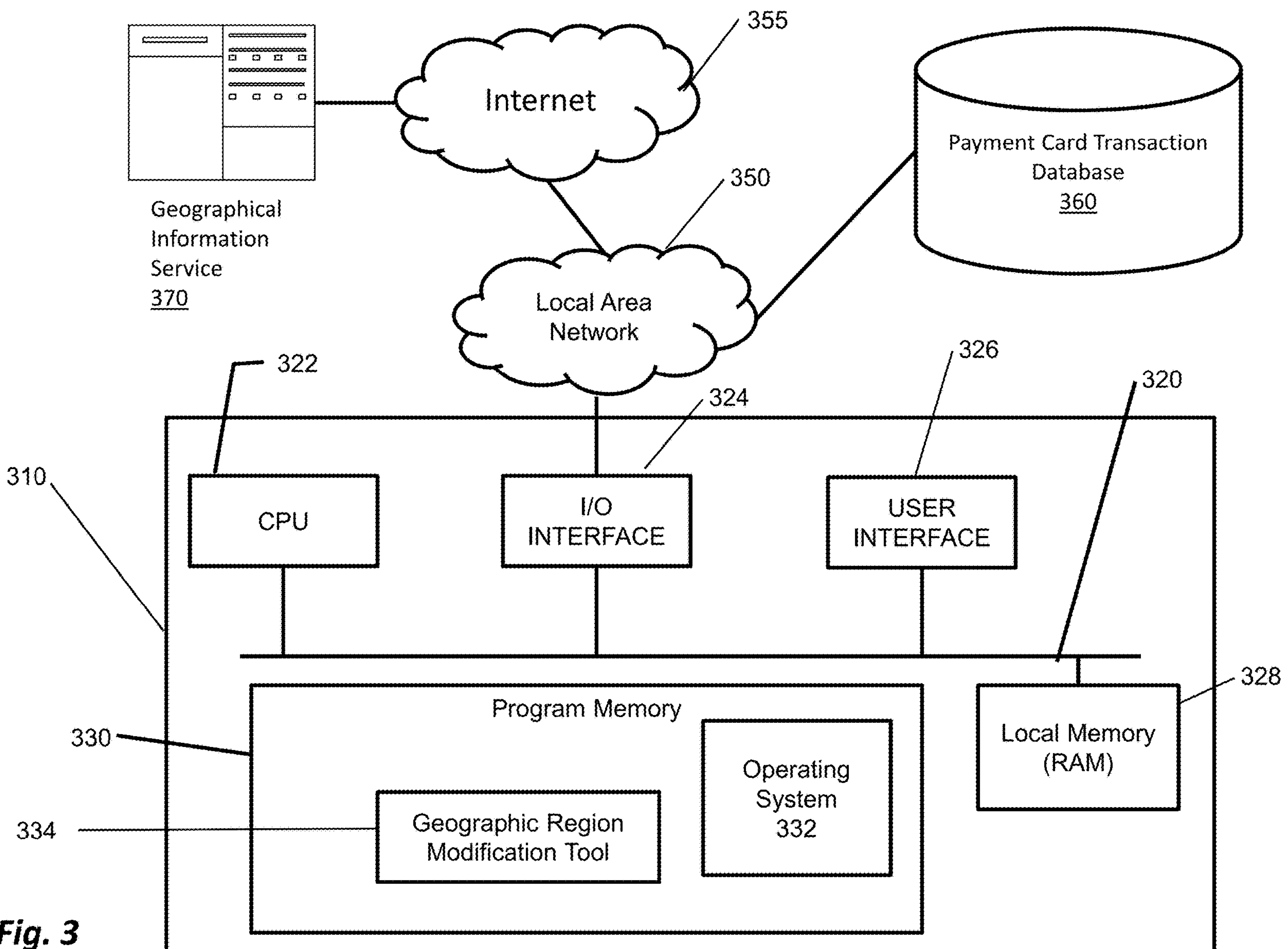
FIG. 3 illustrates an exemplary expanded block diagram of an embodiment of a server architecture of a payment card service provider system in accordance with an exemplary embodiment.

Referring now to FIG. 3, there is shown an expanded block diagram of a sever architecture of the analytics system in accordance with some embodiments. Network server 310 includes exemplary data bus 320 providing communication among system components. One or more computer processors, designated by central processing unit (CPU) 322, are in communication via data bus 320 with components including program memory 330, local memory 328, user interface 326, and input/output interface 324. Program memory 330 stores programs including an operating system (OS) 332, which manages the computer hardware and provides common services for efficient execution of various logic circuitry including hardware, software and/or programs. Program memory 330 further stores application software. The application software includes geographic region modification tool 334, which includes computer-executable instructions to generate suitable queries to a geographic information service to obtain indications of neighboring geographic regions, and to determine modified geographic regions for queries to payment card transaction database 360. In embodiments, program memory 330 may include competitive set query generation program 336, which includes computer-executable instructions to generate queries for submission to the payment card transaction database. and manage the subscription table. Program memory 330 further may include a device communication management program, which includes computer-executable instructions to manage communications, particularly communications with other computer systems and resources, such as payment card transaction database 360 and geographic information service server. The processor 322 (or CPU) carries out the instructions of computer programs, which operates and/or controls at least a portion of the functionality of the network server. Program instructions may be loaded into local memory 328 for efficient and high-speed execution by CPU 322. Programs may be arranged in one or more modules, and functionality of programs may be implemented in program code that may be arranged as one or more programs or modules, which need not be stored on a same memory device, or executed by a single CPU.

Network server 310 further includes device input/output interface 324, which interfaces network server 310 with local area network 350 to connect for data interchange with payment card transaction database 360, and via external networks, such as exemplary Internet 355, with geographical information service server. Data communications may also be accomplished from and/or to peripheral devices and networks operatively coupled to the system. Such networks may include exemplary local area network 350, which manages communications among devices within a card services provider system or third party system. Data storage devices and associated management systems, such as hardware and software for database management systems, may be coupled to local area network 350. Local area network 350 may further be coupled, via one or more intermediary communication devices, such as firewall systems and other access management systems, (not shown), to network 355, which may be or include the Internet, as well as other wired and/or wireless networks, to remote devices and remote systems such as geographical information service server 370. The I/O interface 324 may include a query interface configured to accept and parse requests from remote user devices and pass those requests to CPU 322 for processing using instructions of stored programs, for analysis of data in the subscription database, as well as for user permissions and verification, by way of example.

The program memory 330 may include one or more of any form of data storage device including but not limited to electronic, magnetic, optical recording mechanisms, combinations thereof or any other form of memory device capable of storing data. The CPU 322 may be in the form of one or more computer processors, or may be in such forms as a distributed computing system, a centralized computing system, a network server with communication modules and other processors, or nearly any other automated information processing system capable of executing instructions stored in program memory. The present systems may be embodied as a data warehouse or repository for storing, managing and processing volumes of payment transaction data.

Figure 4A:
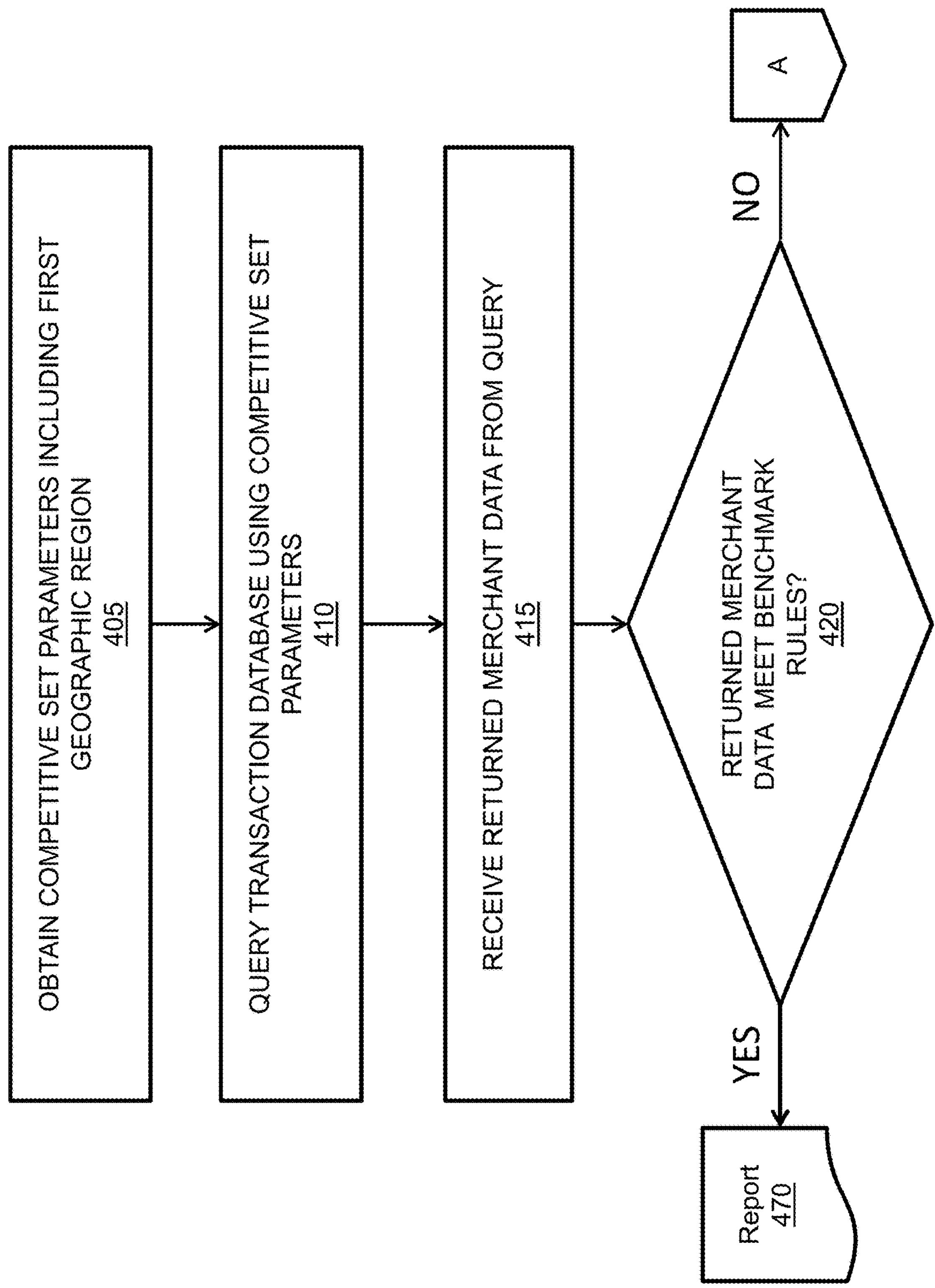
FIGS. 4A-4C illustrate an exemplary process flow diagram of a computerized method useful in implementing some embodiments of the present system and method.
Figure 4B:
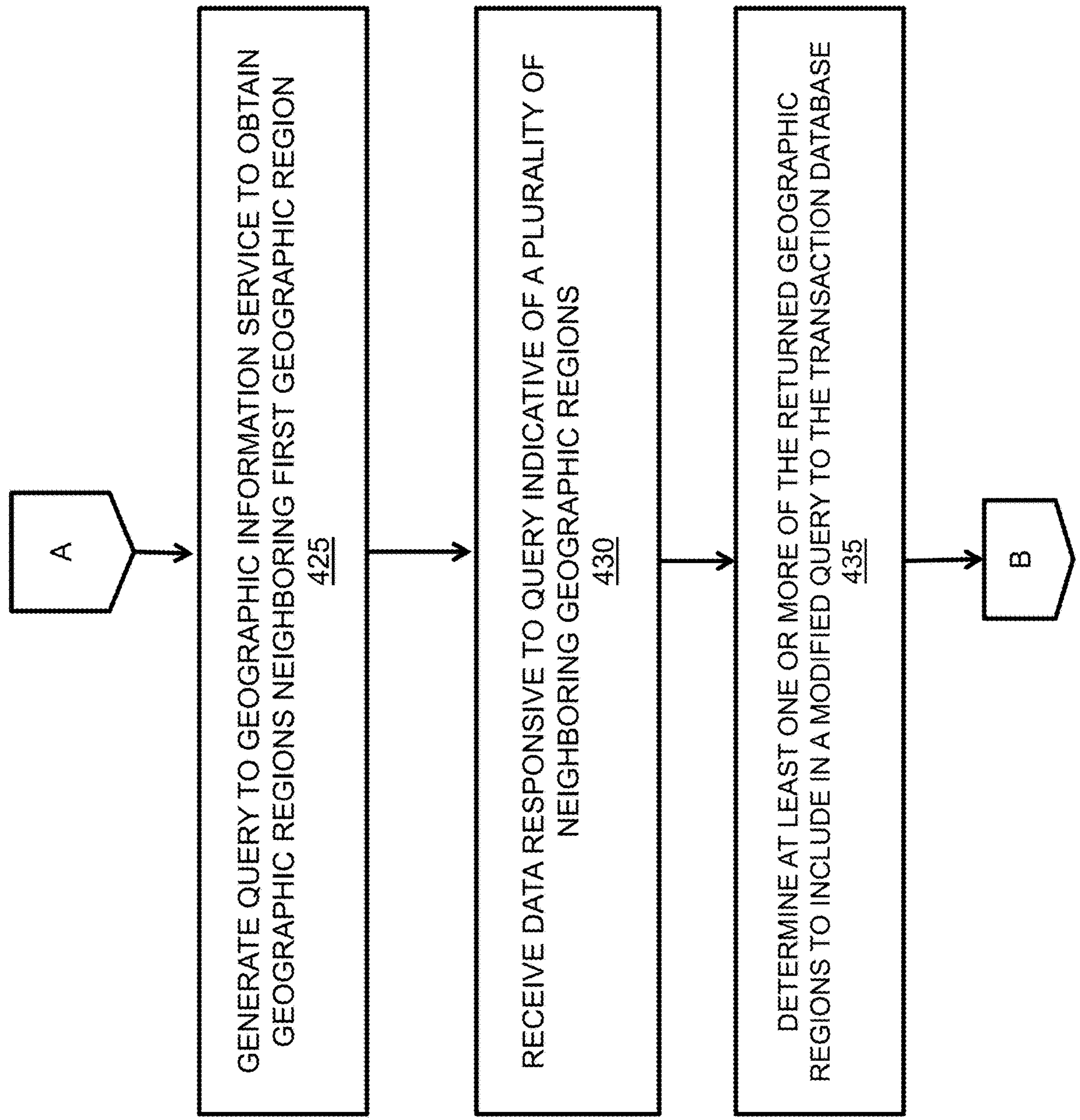
Figure 4C:
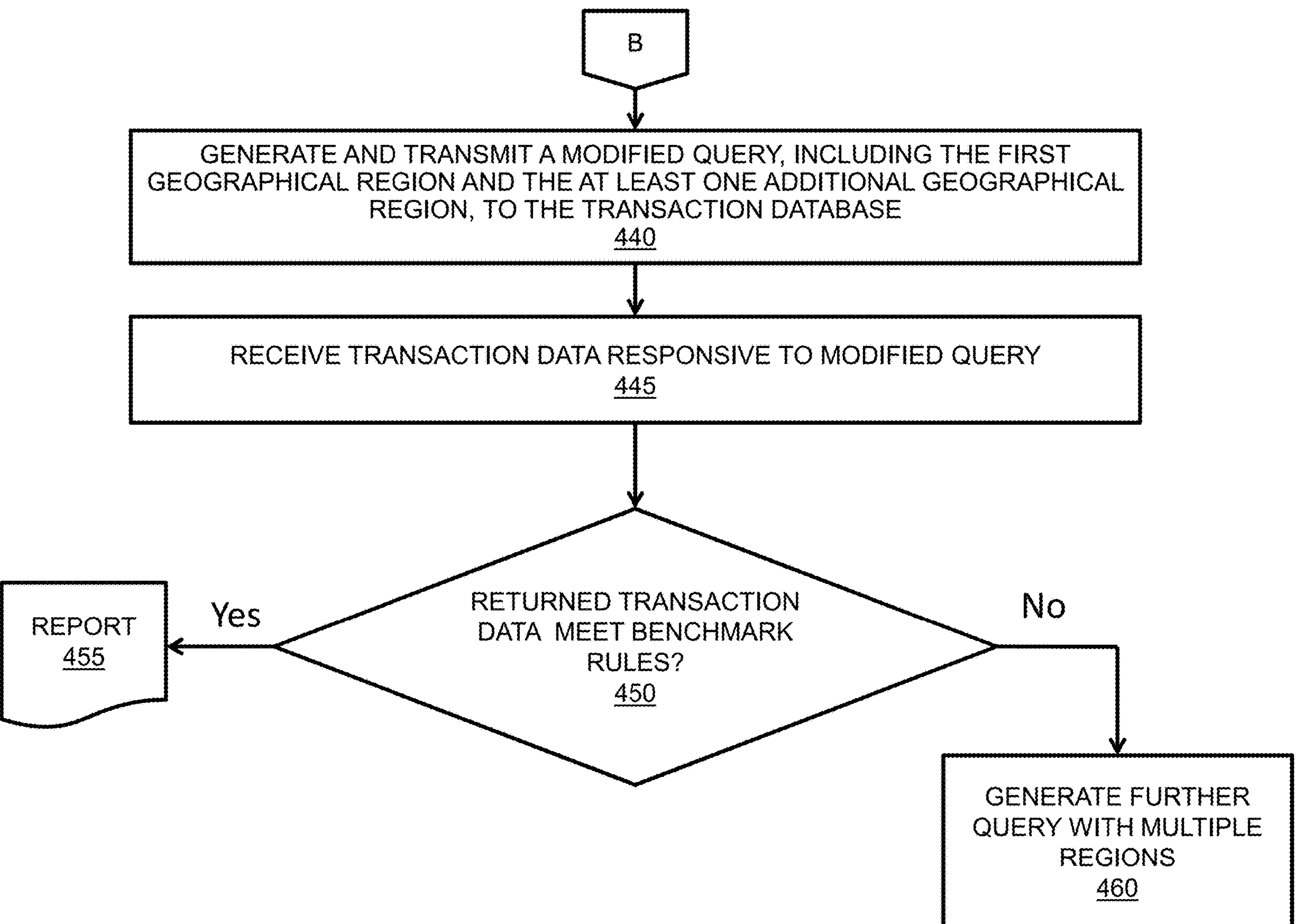

Referring now to FIGS. 4A-4C, there is shown a flow diagram of an exemplary computer-implemented process flow performed by a network server system according to some embodiments. The network server system obtains 405 competitive set parameters, which include a first geographic region. The competitive set parameters may include, in addition to a first geographic region, one or more business definition parameters, such as one or more numeric or alphanumeric codes corresponding to business types, such as SIC codes; date parameters, such as beginning and end dates, as well as more nuanced time and date parameters, such as included or excluded days of week and times of day; business size parameters, such as minimum and/or maximum dollar volume of transactions during a time period, or minimum and/or maximum number of transactions during a time period. Other parameters may be included, such as minimum or maximum transaction size.

The network server system, after obtaining the competitive set data, formats the competitive set data as a suitable query and query 410 the transaction database using the competitive set parameters. The query may be a select query in a Microsoft® Structured Query Language (SQL), or another suitable query language.

In an exemplary embodiment, a simplified query in an approved transactions data set (ApprovedTransactions) for data of approved transactions, in accordance with ISO 8583, including amount, and date and time, for a one month period, for merchants in a particular category code, and merchant in a particular postal code:

```
SELECT    AmountTransaction, TransmissionDate&Time, MerchantID
FROM      ApprovedTransactions
WHERE     (TransmissionDate&Time >= '1-september-2017') AND
(TransmissionDate&Time <= '30-september-2017') AND
(MerchantCategoryCode = 1111) AND (MerchantPostalCode = 11111)
```

The database then returns responsive data to the network server system. The responsive data may include formatted data indicative of payment card transactions, such as a table of date and time data and amount data. The responsive data is received 415 by the network server. The network server then assesses the responsive data against a set of stored benchmark rules to determine whether the responsive data meets the anonymity benchmark rules. The benchmark rules serve to assure that the data represents a sufficient number of merchants, as indicated by MerchantID, that identities of individual merchants are effectively anonymous, once transaction data, with the merchant identification data removed, is provided in a report to a customer. Responsive to the network server determining 420 that the returned merchant data meets the benchmark requirements, the network server may proceed to a step of generating a report 470 for transmission to a system user, for example.

Responsive to the networks server determining that the returned transaction data does not meet the benchmark requirements, referring now to FIG. 4B, the process flow proceeds to generation 425 of a query to a geographic information service to obtain geographic regions neighboring the first geographic region.

An exemplary enhanced SQL query, may take the following exemplary form:

```
SELECT    AmountTransaction, TransmissionDate&Time, MerchantID
FROM      ApprovedTransactions
WHERE     (TransmissionDate&Time >= '1-september-2017') AND
(TransmissionDate&Time <= '30-september-2017') AND
(MerchantCategoryCode = 1111) AND ((MerchantPostalCode = 11111)
OR (MerchantPostalCode = 11112))
```

In the above example, the enhanced query includes a request for approved transaction records in which the value of the merchant postal code field is either of 11111 or 11112, in contrast to the exemplary SQL query above, in which the request is only for approved transaction records in which the value of the merchant postal code field is 11111. Thus, the geographical region definition in the SQL query has been modified by the tool. The tool may include rules to automatically add in the enhanced query additional neighboring geographic regions or postal codes (e.g. with a Boolean OR between postal codes), such as in WHERE clause of a SELECT statement in an SQL query, or otherwise concatenate or aggregate postal codes The neighboring geographic regions may be neighboring postal codes, neighboring governmental units, or other types of neighboring geographic areas. The network server then receives 430 data responsive to the query, the data indicative of a plurality of neighboring geographic regions. The network server then determines 435 at least one of the returned geographic regions to include in a modified query or enhanced query to the transaction database. The determined region may be selected as the smallest total area, one having a longest boundary with the first geographic region, or other criteria. Proceeding to FIG. 4C, the network server may generate and transmit 440 a modified or enhanced query to the transaction database, including parameters including a geographic region defined by both the first geographical region and the one additional neighboring geographic region. Transaction data responsive to the modified query is received 445. The returned transaction data is tested against the benchmark, or anonymity, rules 450. If the transaction data passes, then the transaction data is approved for generation of report 455 to a user. The report generation process removes merchant identification data, such as a MerchantlD field, from the transaction data, before inclusion in the report, such as by suitable instructions in a report generation tool. If the transaction data does not pass, then the system may generate further queries having two, or more than two regions, 460, and repeat the process of querying the transaction database and testing received transaction data.

Figure 5A:
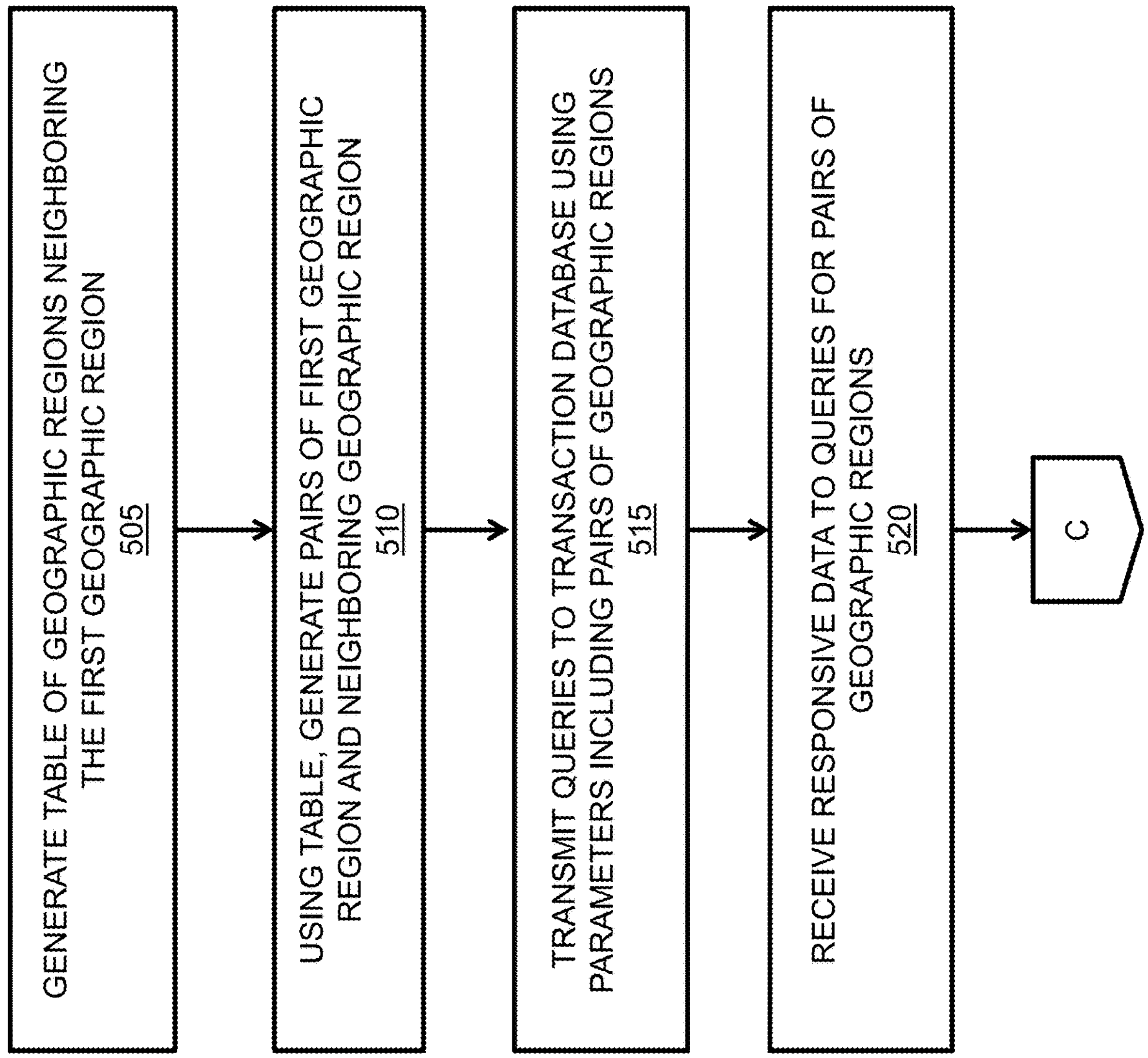
FIGS. 5A-5B illustrate an exemplary process flow diagram of a computerized method for identifying geographical regions to combine with a first geographical region in implementing some embodiments of the present system and method.
Figure 5B:
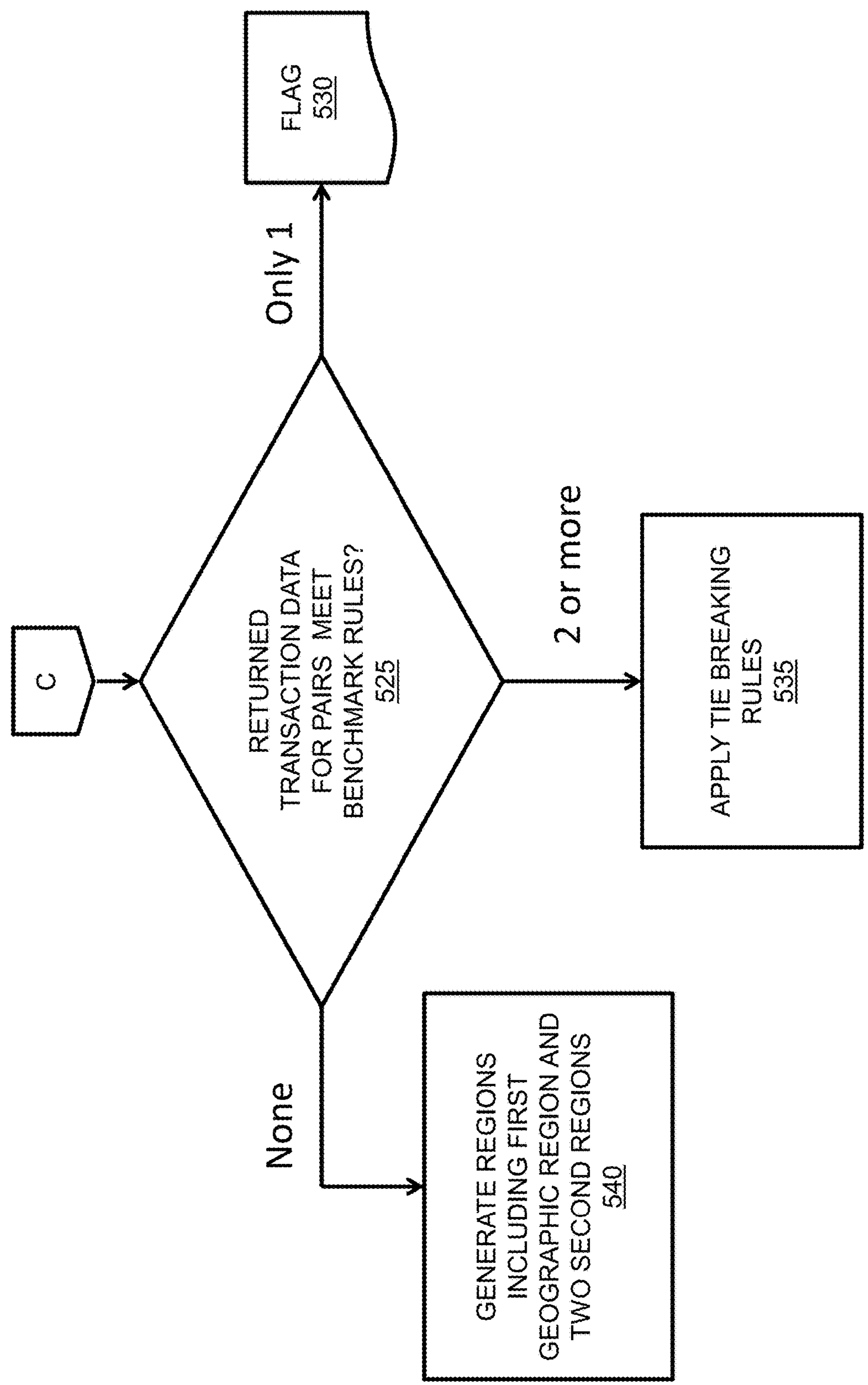

Referring now to FIGS. 5A-5C, there is shown a process flow of an exemplary method of selecting one or more neighboring geographic regions to combine with a first geographic region to determine a broader geographic region for a query to a transaction database. This exemplary method may be performed by a network server executing instructions of a specialized tool, which tool may be in the form of computer-readable instructions The process flow commences following receipt by the network server of a reply to a query to a geographical information service server for regions neighboring the first geographical region. The network server may generate 505 a table of geographic regions neighboring the first geographic region. The table may be stored in local memory in suitable format. The network server then generates 510 pairs of geographic regions, each pair including a first geographic region and a neighboring geographic region. The pairs are employed in queries transmitted 515 to the transaction database, using same parameters, other than geographic limits, as the prior requests. The responsive data to the queries using the pairs is received 520.

The responsive data set for each geographic region pair is then tested 515 against the benchmark rules. Responsive to determining that the data set for only one pair meets the benchmark rules, the system approves the data for generation of a report 530 to the user, and applies an approved flag in a field of the data set, such as by resetting a binary approved/disapproved value in a field from disapproved to approved. Responsive to determining that data sets for two or more pairs meet the benchmark rules, the system moves to application 535 of tie breaking rules. A single tie breaking rule, such as selecting the pair having a smallest geographic area, may be applied. Other tie breaking rules may be applied, such as rules based on nearest proximity of a particular merchant location, such as a location of a requesting merchant to a boundary of one of the second geographical regions. Based on the tie breaking rule, one data set is approved for generation of a report to the user or requesting merchant.

Responsive to determining that no data set meets the benchmarking rules or anonymity criteria, the system proceeds to generating 540 geographical areas combining the first geographical region and two of the second geographical regions. These regions may be generated by starting with a second geographic region sharing a boundary with another second geographical region. These regions may then be employed in queries, and tested against anonymity criteria in a similar manner as discussed above.

Figure 6:
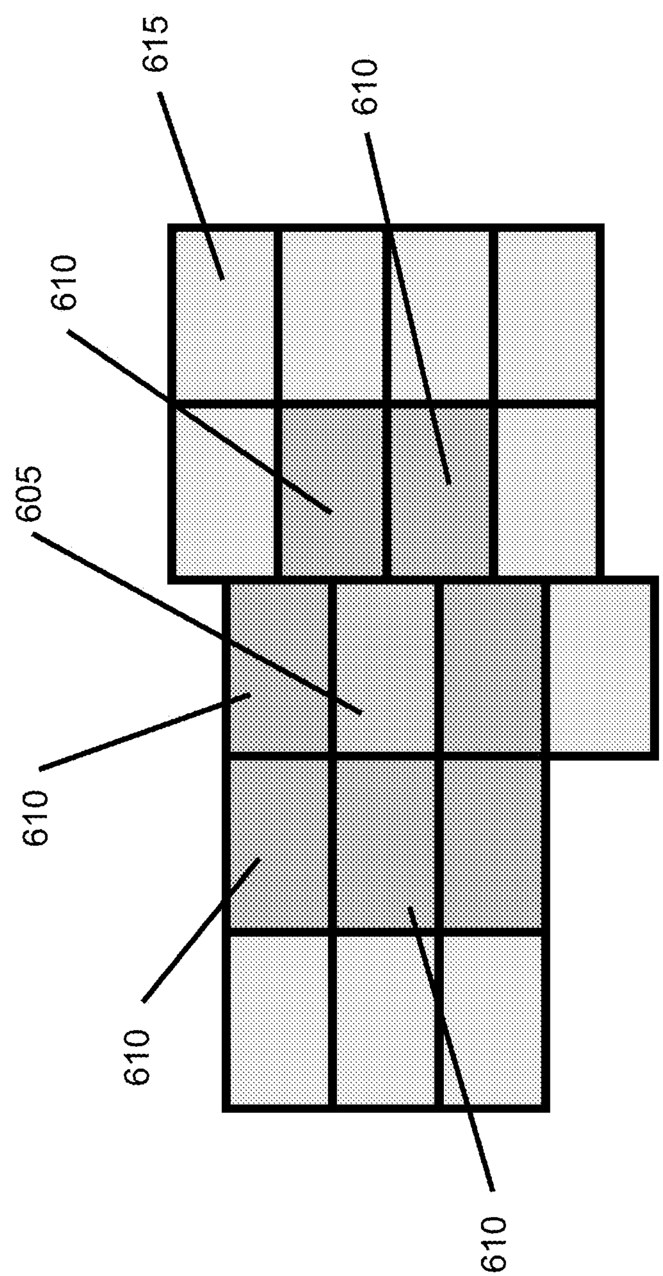
FIG. 6 is an exemplary map display illustrating steps of a computerized method useful in implementing some embodiments of the present system and method.

Referring now to FIG. 6, there is shown an exemplary illustration of geographic regions, which may be postal codes. The first geographic region 605 may be, for example, a postal code in which a requesting merchant is located.

Each second geographic region 610 is a neighboring geographic region, that shares a boundary with first geographic region 605. Each second geographic region 610 may be selected for pairing to generate larger geographic regions in embodiments. Third geographic regions 615 do not neighbor, or share a boundary with, first geographic region 605, and may not be used in an initial set of queries. However, in the event that initial combined regions fail benchmarking, third geographic regions 615 may be added to regions including a neighboring geographic region 610 and the first geographic region 605 to generate queries. In embodiments, such queries may include a third geographic region which is not contiguous with the second geographic region.

In embodiments, rules may be applied to determine if first geographic region 605 may be combined with a given second geographic region 610. For example, rules may prohibit use of postal codes crossing geographic lines, such as lines of counties or boroughs.

Figure 7:
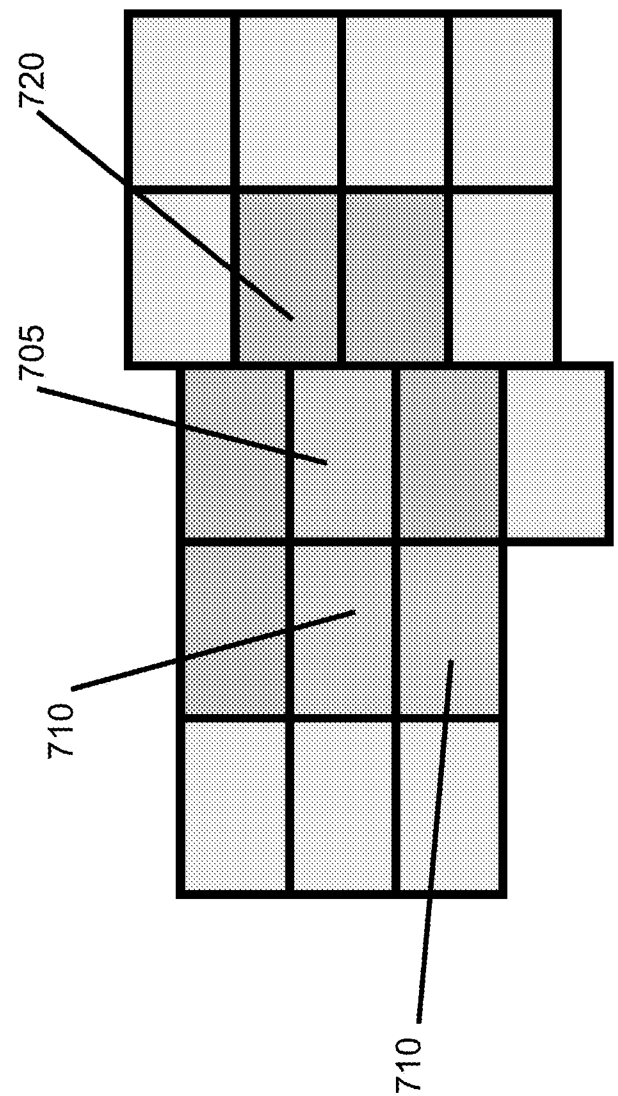
FIG. 7 is an exemplary map display, similar to FIG. 6, illustrating steps of a computerized method useful in implementing some embodiments of the present system and method.

Referring now to FIG. 7, an exemplary illustration of geographic regions is shown, in which first geographic region 705 may be combined with either of neighboring geographic regions 710, as, for both combined geographic regions, a returned data set from a transaction database passed anonymity criteria. Neighboring geographic region 720, when a data set of a region combined with first geographic region 705 was assessed against the benchmark test, did not meet criteria, and may not be employed in a report.

Other variations and embodiments are possible. For example, while initially using pairs of geographic regions has been disclosed above, embodiments employing combinations of three or more regions in an initial step may be employed.

The flow charts described herein do not imply a fixed order to the steps, and embodiments of the present invention may be practiced in any order that is practicable. In embodiments, one or more steps of the methods may be omitted, and one or more additional steps interpolated between described steps. Note that any of the methods described herein may be performed by hardware, software, or any combination of these approaches. For example, a non-transitory computer-readable storage medium may store thereon instructions that when executed by a processor result in performance according to any of the embodiments described herein. The instructions may define a tool for interfacing with a geographical information service interface to enhance data queries. The instructions may be stored on one or more non-transitory computer-readable storage media, and may be in one or more modules. In embodiments, each of the steps of the methods may be performed by a single computer processor or CPU, or performance of the steps may be distributed among two or more computer processors or CPU's of two or more computer systems.

The embodiments described herein are solely for the purpose of illustration. Those in the art will recognize that other embodiments may be practiced with modifications and alterations limited only by the claims.

What is claimed is:

1. A computerized method for interfacing with a geographical information service interface to enhance data queries, comprising:

receiving, by a network server, data indicative of a failure of a query to a merchant information database as a result of a failure of data indicative of a response to the query to pass a benchmarking test;

receiving, by the network server, data indicative of a first postal code associated with the query;

generating, by the network server, a query for submission to a geographical information service interface seeking data indicative of second postal codes sharing a boundary with the first postal code, and transmit the generated query;

receiving, by the network server, responsive to the query, data indicative of a plurality of second postal codes sharing a boundary with the first postal code;

generating, by the network server, a plurality of queries for transmission to the merchant information database, each query including a geographic parameter including a pair of the first postal code and one of the second postal codes, and transmit the plurality of queries to the merchant information database;

receiving, by the network server, responsive to the queries to the merchant information database, a plurality of data sets indicative of responses;

applying, by the network server, the benchmarking test to the plurality of responses, to determine a data set for reporting.

2. The computerized method of claim 1, further comprising, responsive to the application of the benchmarking test identifying one and only one data set as passing the benchmarking test, approving generation of a report using the one passing data set.

3. The computerized method of claim 1, further comprising, responsive to the application of the benchmarking test identifying a plurality of data sets as passing the benchmarking test, applying a tie breaking rule.

4. The computerized method of claim 3, wherein the tie breaking rule comprises selecting a data set corresponding to a smallest geographic area.

5. The computerized method of claim 1, further comprising, responsive to the application of the benchmarking test identifying no data sets as passing the benchmarking test, generating geographic areas including the first postal code and two second postal codes.

6. A computer system, comprising:

one or more computer processors;

an input/output device coupled to the one or more computer processors and to a network;

a data storage device;

a memory unit storing computer-executable instructions, which instructions, when executed by the one or more computer processors, cause the one or more computer processors to:

receive data indicative of a first geographical area defined by a boundary;

generate a query for submission to a geographical information service interface;

furnish the query, via the input/output device, to the geographical information service interface;

receive, via the input/output device, from the geographical information service interface, data responsive to the query, the data responsive to the query including data identifying a plurality of second geographical areas neighboring the first geographical area;

generate a query for submission to a data warehouse containing data indicative of payment card transactions, the payment card transaction data including at least merchant location data indicative of geographical area associated with a merchant and at least one other merchant attribute, the query including a request for data responsive to merchants associated with the first geographical area and at least one of the second geographical areas and a competitive data set;

transmit the generated query to the data warehouse;

receive a response to the generated query from the data warehouse;

determine, based on anonymity criteria, whether the received response qualifies for transmission to a third party; and responsive to determining that the received response qualifies for transmission to a third party, based on the anonymity criteria, flag the response for transmission to the third party.

7. The system of claim 6, wherein the instructions further cause the one or more computer processors to generate a plurality of queries, each of the plurality of queries including a request for data responsive to merchants associated with the first geographical area and exactly one of the second geographical areas and a competitive data set, transmit the generated queries to the data warehouse; and receive data sets responsive to each of generated queries from the data warehouse.

8. The system of claim 7, wherein the instructions further cause the one or more computer processors to determine, based on the anonymity criteria, whether each of the received data sets qualifies for transmission to the third party; and responsive to determining that one and only one of the received data sets qualifies for transmission to the third party, based on the anonymity criteria, flag the qualified data set for transmission to the third party.

9. The system of claim 7, wherein the instructions further cause the one or more computer processors to determine, based on the anonymity criteria, whether each of the received data sets qualifies for transmission to the third party; and responsive to determining that a plurality of the received data sets qualifies for transmission to the third party, apply a tie breaking rule to identify one of the qualified data sets for transmission to the third party.

10. The system of claim 9, wherein the tie breaking rule determines the one of the qualified data sets for transmission to the third party based on the qualified data set having a smallest geographic area.

11. The system of claim 7, wherein the instructions further cause the one or more processors to determine, based on the anonymity criteria, whether each of the received data sets qualifies for transmission to the third party; and responsive to determining that none of the received data sets qualifies for transmission to the third party, generate further geographic regions including the first geographic area and two or more second geographic regions.

12. A non-transitory computer-readable medium storing computer-readable instructions defining a tool for interfacing with a geographical information service interface to enhance data queries, which instructions, when executed by one or more computer processors, cause the one or more computer processors to:

receive data indicative of a first geographical area defined by a boundary;

generate a query for submission to a geographical information service interface;

furnish the query to the geographical information service interface;

receive from the geographical information service interface, data responsive to the query, the data responsive to the query including data identifying a plurality of second geographical areas neighboring the first geographical area;

generate a query for submission to a data warehouse containing data indicative of payment card transactions, the payment card transaction data including at least merchant location data indicative of geographical area associated with a merchant and at least one other merchant attribute, the query including a request for data responsive to merchants associated with the first geographical area and at least one of the second geographical areas and a competitive data set;

transmit the generated query to the data warehouse;

receive a response to the generated query from the data warehouse;

determine, based on anonymity criteria, whether the received response qualifies for transmission to a third party; and responsive to determining that the received response qualifies for transmission to a third party, based on the anonymity criteria, flag the response for transmission to the third party.

13. The non-transitory computer-readable medium of claim 12, wherein the instructions further cause the one or more computer processors to generate a plurality of queries, each of the plurality of queries including a request for data responsive to merchants associated with the first geographical area and exactly one of the second geographical areas and a competitive data set, transmit the generated queries to the data warehouse; and receive data sets responsive to each of generated queries from the data warehouse.

14. The non-transitory computer-readable medium of claim 13, wherein the instructions further cause the one or more computer processors to determine, based on the anonymity criteria, whether each of the received data sets qualifies for transmission to the third party; and responsive to determining that one and only one of the received data sets qualifies for transmission to the third party, based on the anonymity criteria, flag the qualified data set for transmission to the third party.

15. The non-transitory computer-readable medium of claim 13, wherein the instructions further cause the one or more computer processors to determine, based on the anonymity criteria, whether each of the received data sets qualifies for transmission to the third party; and responsive to determining that a plurality of the received data sets qualifies for transmission to the third party, apply a tie breaking rule to identify one of the qualified data sets for transmission to the third party.

16. The non-transitory computer-readable medium of claim 15, wherein the tie breaking rule determines the one of the qualified data sets for transmission to the third party based on the qualified data set having a smallest geographic area.

17. The non-transitory computer-readable medium of claim 13, wherein the instructions further cause the one or more processors to determine, based on the anonymity criteria, whether each of the received data sets qualifies for transmission to the third party; and responsive to determining that none of the received data sets qualifies for transmission to the third party, generate further geographic regions including the first geographic area and two or more second geographic regions.

* * * * *